US009678691B2

(12) United States Patent
Takeuchi

(10) Patent No.: US 9,678,691 B2
(45) Date of Patent: Jun. 13, 2017

(54) IMAGE FORMING APPARATUS FOR PRINTING JOBS IN AN ORDER ACCORDING TO A TIME OF SUBMISSION

(71) Applicant: BROTHER KOGYO KABUSHIKI KAISHA, Nagoya-shi, Aichi-ken (JP)

(72) Inventor: Masahide Takeuchi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/632,749

(22) Filed: Feb. 26, 2015

(65) Prior Publication Data

US 2015/0242164 A1 Aug. 27, 2015

(30) Foreign Application Priority Data

Feb. 27, 2014 (JP) ................................. 2014-037264

(51) Int. Cl.
G06F 3/12 (2006.01)
(52) U.S. Cl.
CPC .......... *G06F 3/1212* (2013.01); *G06F 3/1238* (2013.01); *G06F 3/1263* (2013.01); *G06F 3/1285* (2013.01)
(58) Field of Classification Search
CPC ... G06F 3/1238; G06F 3/1263; H04N 1/4433; H04N 1/4413
See application file for complete search history.

(56) References Cited

U.S. PATENT DOCUMENTS

| 2006/0256364 A1* | 11/2006 | Yamamoto | G06F 21/608 358/1.14 |
| 2009/0231609 A1* | 9/2009 | Chipchase | G06F 3/1215 358/1.15 |

(Continued)

FOREIGN PATENT DOCUMENTS

| JP | 2003-228262 A | 8/2003 |
| JP | 2006-341591 A | 12/2006 |

(Continued)

OTHER PUBLICATIONS

Notice of Reasons for Rejection from corresponding Japanese Patent Application No. 2014-037264, issued Jan. 17, 2017.

*Primary Examiner* — Benjamin O Dulaney
(74) *Attorney, Agent, or Firm* — Merchant & Gould P.C.

(57) ABSTRACT

There is provided an image forming apparatus including: an image forming portion, an accepting portion accepting print jobs and identification information associated with the print jobs, a storage portion storing the print jobs and the identification information, an identification information input portion, and a controller. The controller is configured to: cause the storage portion to store an acceptance time at which the accepting portion accepts each of the print jobs, authenticate the identification information, extract the print jobs associated with the authenticated identification information from the print jobs stored in the storage portion, acquire a difference time which is a difference between an authentication time of authenticating the identification information and an acceptance time of accepting the extracted print jobs, and cause the image forming portion to carry out image formation for all the print jobs with the acquired difference time within a first time period.

5 Claims, 11 Drawing Sheets

(56) References Cited

U.S. PATENT DOCUMENTS

2010/0027069 A1    2/2010  Ogishima
2010/0182624 A1*  7/2010  Murakami ............ G06F 3/1204
                                                      358/1.9
2013/0003105 A1*  1/2013  Yamada ............. G06K 15/1859
                                                     358/1.14

FOREIGN PATENT DOCUMENTS

| | | |
|---|---|---|
| JP | 2008-73973 A | 4/2008 |
| JP | 2009-143084 A | 7/2009 |
| JP | 2010-052254 A | 3/2010 |
| JP | 2010-52427 A | 3/2010 |
| JP | 2010-177997 A | 8/2010 |
| JP | 2011-223180 A | 11/2011 |
| JP | 2013-135285 | 7/2013 |

* cited by examiner

Fig. 7

|   | USER | JOB NAME | JOB TYPE | PASSWORD | ACCEPTANCE TIME |
|---|---|---|---|---|---|
| 1 | X | A | SECURE | ○○○○ | 2014.2.10 22:00 |
| 2 | X | B | ORDINARY |  | 2014.2.12 5:00 |
| 3 | Y | C | SECURE | △△△△ | 2014.2.12 14:00 |
| 4 | X | D | SECURE | □□□□ | 2014.2.12 18:00 |
| 5 | X | E | SECURE | ×××× | 2014.2.12 22:00 |

IMAGE FORMING APPARATUS FOR PRINTING JOBS IN AN ORDER ACCORDING TO A TIME OF SUBMISSION

CROSS REFERENCE TO RELATED APPLICATION

The present application claims priority from Japanese Patent Application No. 2014-037264 filed on Feb. 27, 2014 the disclosure of which is incorporated herein by reference in its entirety.

BACKGROUND

Field of the Invention

The present invention relates to image forming apparatuses capable of storing print jobs.

Description of the Related Art

Conventional image forming apparatuses carry out image formation for print jobs in order from the earliest time and date stored in the image forming apparatuses.

SUMMARY

However, if there is a large difference between the time and date at which an authentication operation is made by a user, and the time and date at which a job is stored (one day or one week, for example), then even though the print job with a large difference between those times and dates has a low necessity to form images, the user still have to obtain the printed materials from those related to the print job with the earliest time and date stored in the image forming apparatus. Therefore, there is such a problem that it is not possible to soon obtain the printed material related to the print job stored latest in the image forming apparatus from the user.

The present teaching discloses an image forming apparatus which carries out image formation for all print jobs with such a difference within a predetermined time period as between the time at which an authentication operation is made by a user, and the time at which a job is stored.

There is provided an image forming apparatus configured to form an image, including:

an image forming portion configured to form an image on a sheet;

an accepting portion configured to accept print jobs for the image forming portion, and identification information associated with the print jobs;

a storage portion configured to store the print jobs and the identification information accepted by the accepting portion;

an identification information input portion from which the identification information is input; and a controller configured to:

cause the storage portion to store an acceptance time at which the accepting portion accepts each of the print jobs;

authenticate the identification information input from the identification information input portion;

extract the print jobs associated with the authenticated identification information, from the print jobs stored in the storage portion;

acquire a difference time which is a difference between an authentication time of authenticating the identification information and an acceptance time of accepting the extracted print jobs; and cause the image forming portion to carry out image formation for all the print jobs with the acquired difference time within a first time period.

According to the above configuration, when the accepting portion accepts a print job and identification information, then the storage portion stores an acceptance time of accepting the print job, together with the print job and identification information. When the identification information input from the identification information input portion is authenticated, then the print jobs associated with the identification information are extracted from the print jobs stored in the storage portion. Then, the image forming portion forms images on a sheet of paper for all the print jobs with such a difference between the authentication time of authenticating the identification information and the acceptance time of accepting the extracted print jobs as falling within the predetermined time period. Therefore, it is possible for a user to obtain the printed materials (sheets of paper with the formed images) soon after authenticating the identification information, according to all the print jobs stored in the storage portion within that predetermined time period.

BRIEF DESCRIPTION OF THE DRAWINGS

FIG. 7 shows an example of print jobs accumulated in a RAM;

DESCRIPTION OF THE EMBODIMENTS

Hereinbelow, referring to the accompanying drawings, a first embodiment of the present teaching will be explained in detail.

<Mechanical Configuration>

Figure 1:
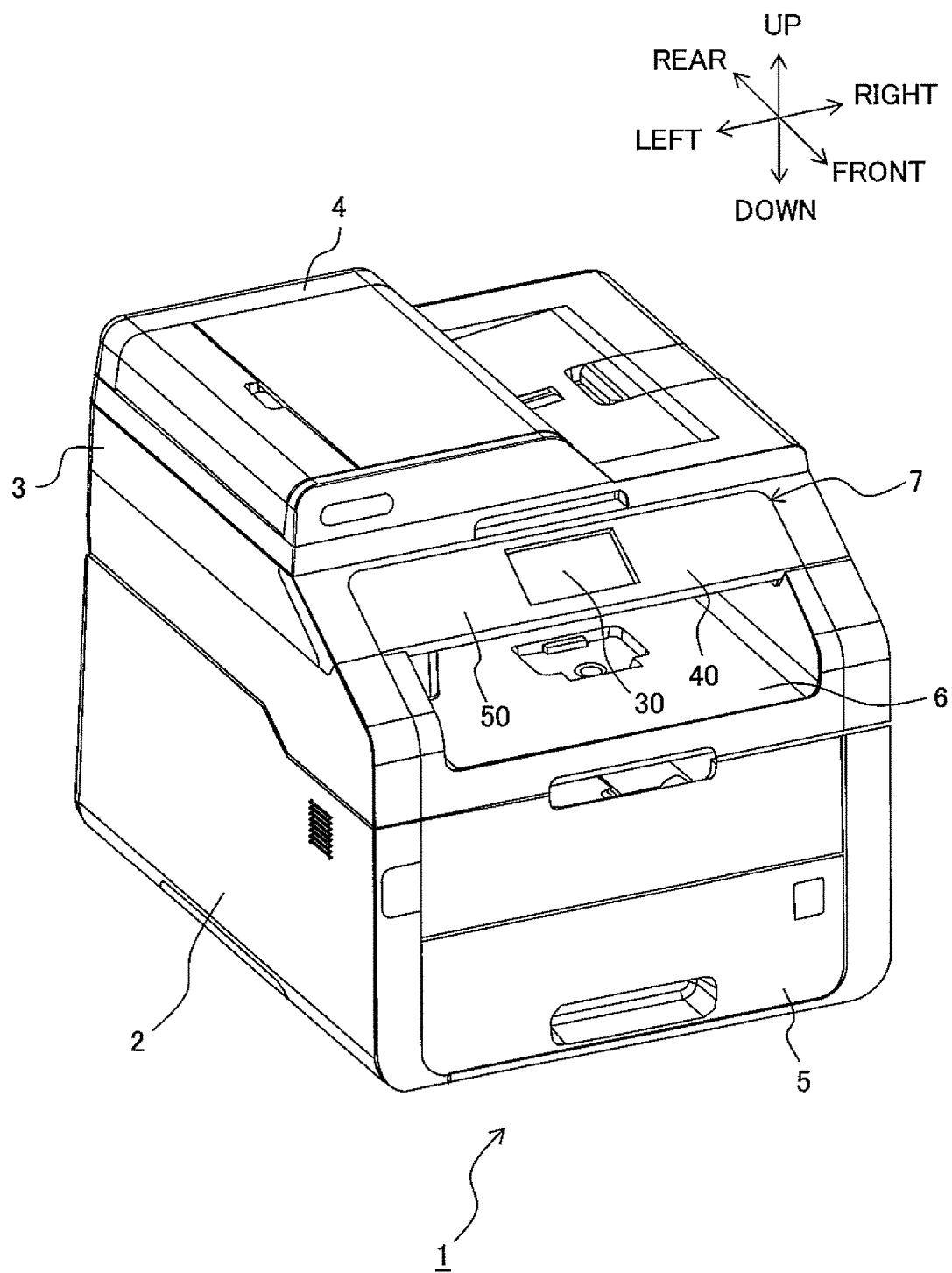
FIG. 1 is a perspective view of an MFP observed from front and upper left according to a first embodiment of the present invention.

As one example of the image forming apparatus, an MFP (Multi-Function Peripheral) 1 includes a printer unit 2, a scanner unit 3, and an ADF (Auto Document Feeder) 4 as depicted in FIG. 1.

Further, the following explanation will use each of the upward, downward, leftward, rightward, frontward and rearward directions which are defined as viewing the MFP 1 placed on a plane surface from the side on which an operation panel 7 (to be described later) is provided.

An image forming portion 10 (see FIG. 2) is housed in the printer unit 2. The image forming portion 10 carries out printing (color printing or black-and-white printing) based on image data, so as to form images on a sheet of paper.

Either electrophotographic method or ink jet method may be used for the image formation.

A paper feed tray 5 is provided in the lowest part of the printer unit 2. The paper feed tray 5 is configured to be loadable with a plurality of sheets of paper in a piled-up state. A paper discharge tray 6 is formed on the upper surface of the printer unit 2. The paper loaded on the paper feed tray 5 is sent out one sheet by one sheet from the paper feed tray 5 into the printer unit 2, and then conveyed through the printer unit 2 toward the paper discharge tray 6. While the paper is being conveyed through the printer unit 2, the image forming portion 10 forms images on that paper. The paper (a printed material) with images formed thereon is discharged to the paper discharge tray 6.

The scanner unit 3 is arranged above the printer unit 2, while the ADF 4 is arranged above the scanner unit 3.

Further, the MFP 1 includes the operation panel 7. The operation panel 7 is, for example, arranged on a front end portion of the scanner unit 3. The operation panel 7 is provided with a display 30, an operating portion 40, and an NFC (Near Field Communication) portion 50.

The display 30 includes a liquid crystal display, for example. The display 30 is configured to display various pieces of information.

The operating portion 40 includes various manual operation buttons. Various kinds of input are made possible by pressing those manual operation buttons. The manual operation buttons include, for example, an OK button for affirming various instructions (such as an instruction to start image processing and the like), a cancel button for cancelling various instructions, a crisscross button for selecting a key displayed on the display 30, a numerical keypad for inputting numbers and some characters, etc.

As one example of the identification information input portion, the NFC portion 50 can carry out wireless two-way communications between itself and a noncontact IC card such as an ID card or the like.

<Electrical Configuration>

Figure 2:
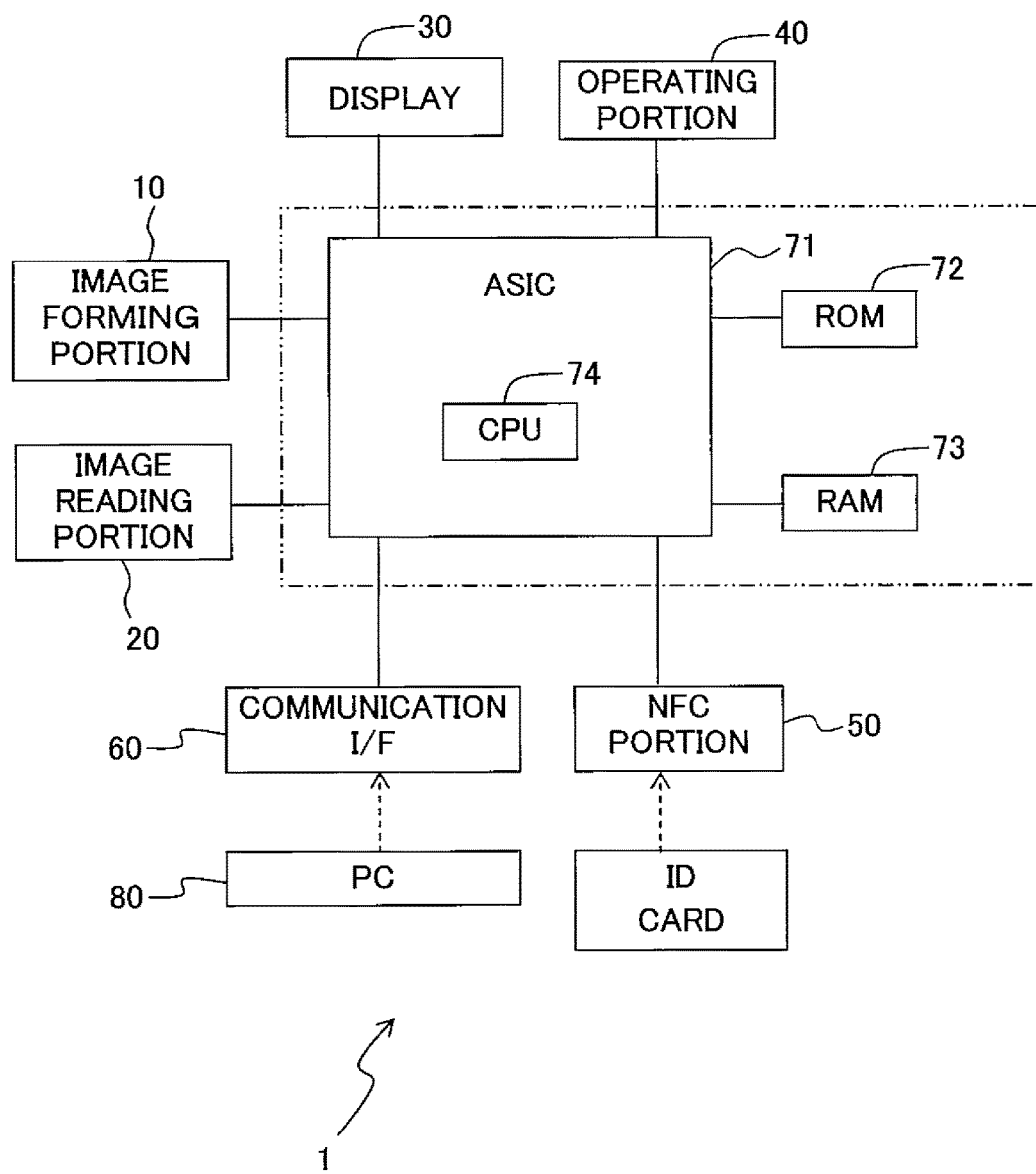
FIG. 2 is a block diagram showing an electrical configuration of the MFP.

The MFP 1 includes, as depicted in FIG. 2, a communication interface (I/F) 60 and a control portion 70.

As one example of the accepting portion, the communication interface 60 is an interface for communications with external devices such as PCs (Personal Computers) connected to a LAN (Local Area Network). Either wireless communications or wire communications may be used as the communication method.

The control portion 70 includes an ASIC (Application Specific Integrated Circuit) 71, a ROM 72, and a RAM 73.

The ASIC 71 incorporates the CPU 74. Such data are input to the ASIC 71: instructions through operating the operating portion 40, and identification information read in by the NFC portion 50 from ID cards. Further, print jobs sent from external devices are input to the ASIC 71 via the communication interface 60. FIG. 2 shows a PC (Personal Computer) 80 as one example of the external device. Based on the information input to the ASIC 71, the CPU 74 executes programs for various processes to control the image forming portion 10, an image reading portion 20 and the display 30, and to control communications via the communication interface 60.

Further, the following explanation will take an example of the MFP 1 accepting a print job sent from the PC 80.

The ROM 72 stores the programs to be executed by the CPU 74, various data, etc.

As one example of the storage portion, the RAM 73 is used as a work area for the CPU 74 to execute the programs.

<Print Job Process>

Figure 3A:
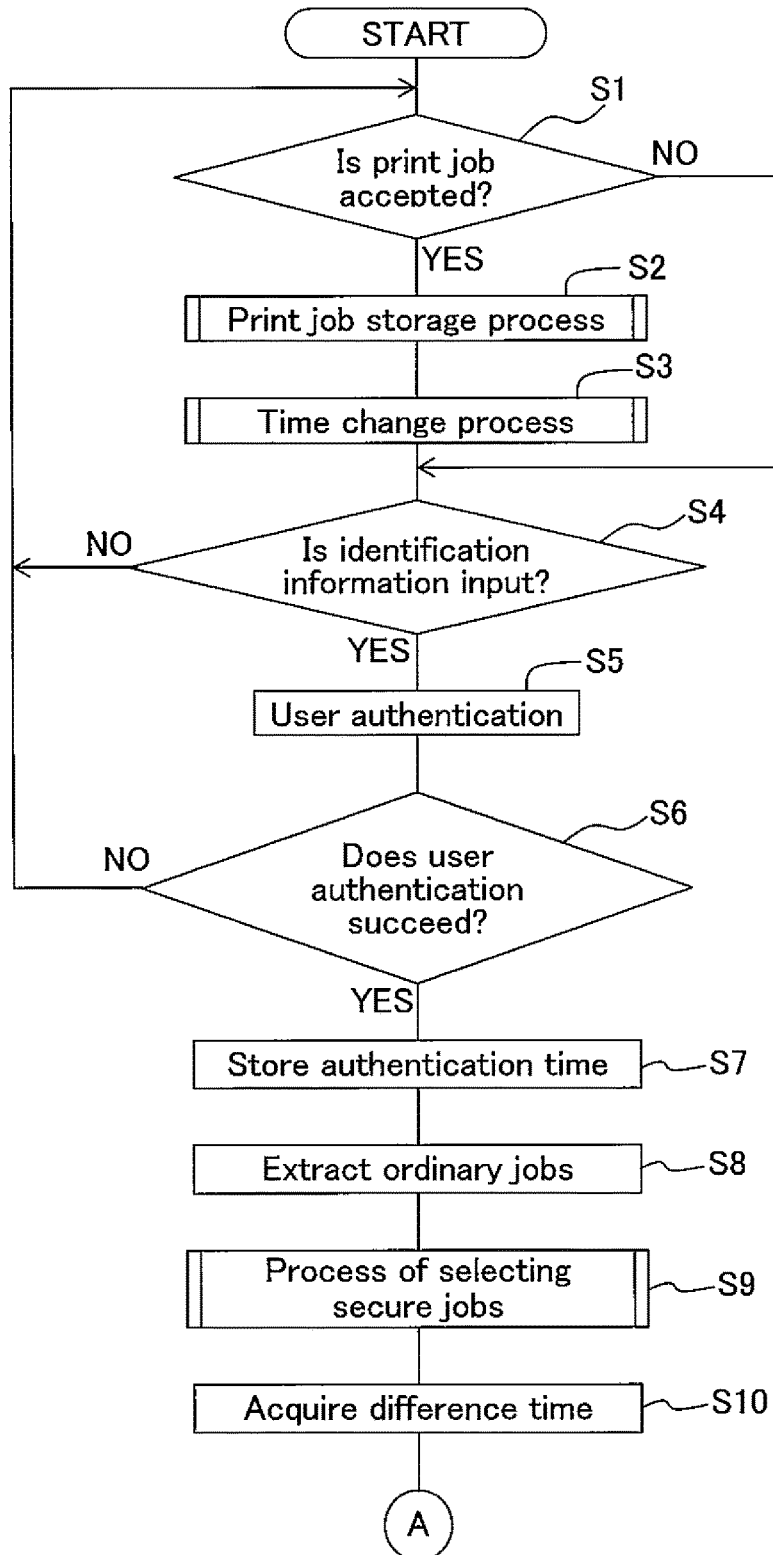
FIG. 3A is a (first) flowchart showing a process flow of a print job.
Figure 3B:
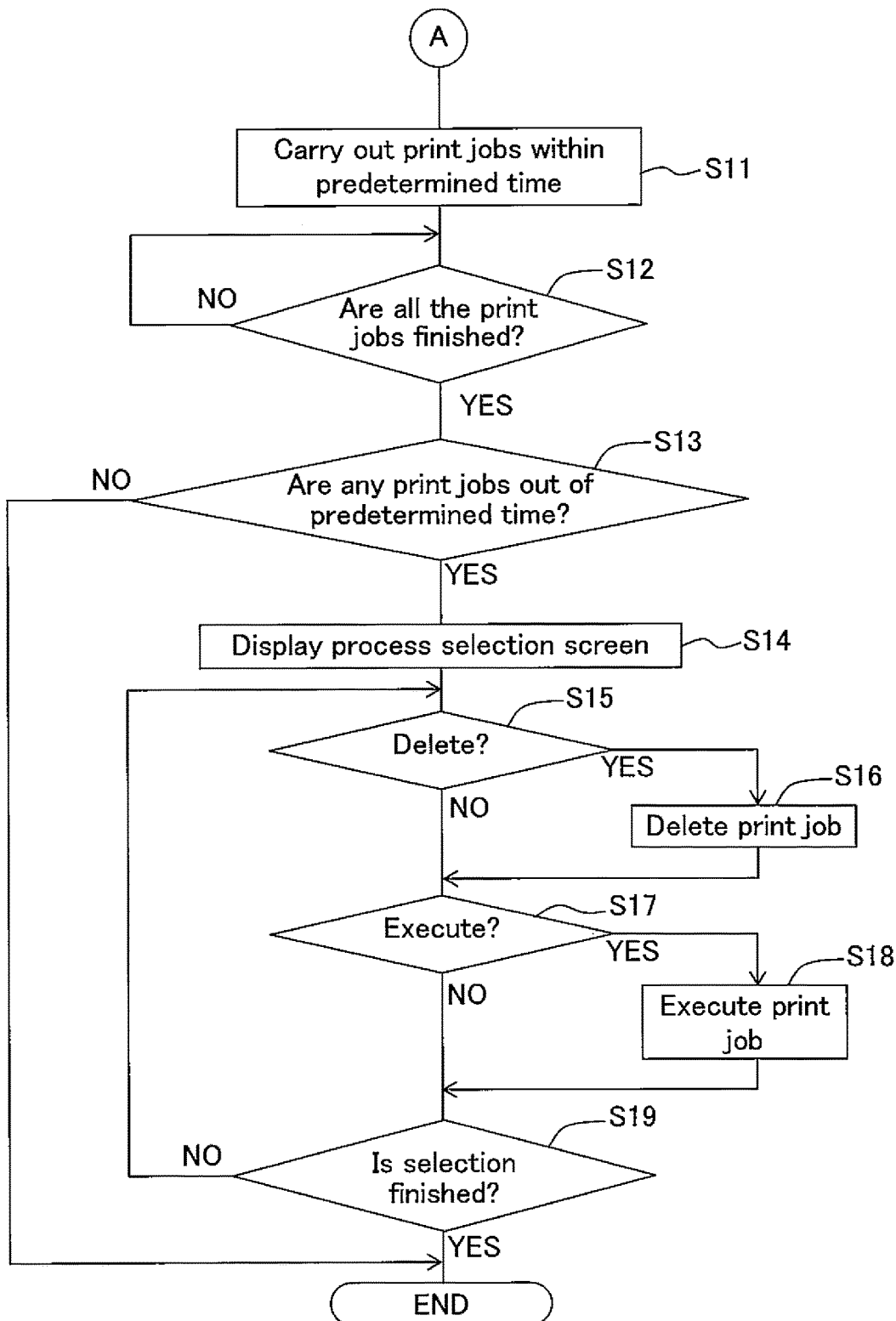
FIG. 3B is a (second) flowchart showing the process flow of the print job.

With the MFP 1 being powered on, the CPU 74 of the ASIC 71 repetitively carries out a print job process depicted in FIG. 3A and FIG. 3B.

In the print job process, the CPU 74 determines whether or not the MFP 1 has accepted a print job (step S1; to be simply described as S1, below).

As job types, print jobs include ordinary jobs and secure jobs. The ordinary jobs are print jobs with which no password is set for secure print, whereas the secure jobs are print jobs with which a password is set for secure print. The password for secure print is set by a user through operating the PC 80 when sending the print job.

When the MFP 1 accepts a print job (S1: Yes), then the CPU 74 carries out a print job storage process (S2). The print job storage process causes the RAM 73 to store the print job including an image data as well as the identification information of the user sending the print job (user ID) and the acceptance time (time and date) of accepting the print job. The print job storage process will be described later in detail.

Further, the CPU 74 carries out a time change process (S3). The time change process changes a time range for selecting print jobs to be carried out preferentially. The time change process will be described later in detail.

After carrying out the print job storage process and the time change process, the CPU 74 determines whether or not the identification information has been input (S4). For example, the user lets his or her ID card approach the NFC portion 50. Then, the NFC portion 50 reads in the identification information from the ID card, and that identification information is input to the ASIC 71. The identification information includes the user ID and the password for user authentication.

When the identification information is not yet input (S4: No), then the CPU 74 repeats the process of the steps S1 to S3 and, on accepting another print job, carries out the print job storage process and the time change process. By repeating the print job storage process, print jobs are accumulated in the RAM 73.

When the identification information is input (S4: Yes), then the CPU 74 carries out a process of user authentication (S5). A user management table is used in the user authentication. The user management table is stored in, for example, an NVRAM (Non Volatile RAM) which is not depicted. The user management table coordinates a password for user authentication with the user ID of each user permitted to use the MFP 1. In the user authentication, the CPU 74 determines whether or not in the user management table, there is a combination of the user ID included in the input identification information and the password for user authentication and, if that combination is in the user management table, then the CPU 74 determines that the user authentication is successful.

When the user authentication is not successful (S6: No), then the CPU 74 returns the process to the step S1 to determine again whether or not the MFP 1 has accepted a print job (S1).

When the user authentication is successful (S6: Yes), then the CPU 74 causes the RAM 73 to store an authentication time which is the time of carrying out the user authentication (S7).

Thereafter, the CPU 74 extracts the ordinary jobs of the authenticated user from the print jobs accumulated in the RAM 73 (S8). The extracted ordinary jobs are included in a batch print list.

After extracting the ordinary jobs, the CPU 74 carries out a process of selecting secure jobs (S9). The process of selecting secure jobs adds the secure jobs selected by the user to the batch print list. The process of selecting secure jobs will be described later in detail.

Subsequently, the CPU 74 acquires a difference time which is a difference in time between the time of accepting the print job and the authentication time, for each print job included in the batch print list (S10).

Then, the CPU 74 sequentially carries out all the print jobs with the difference time within a predetermined time period, from the print job with the latest acceptance time (S11). Carrying out a print job refers to such a process that the CPU 74 controls the image forming portion 10 based on the image data included in the print job to cause the image forming portion 10 to form, on the paper, images corresponding to the image data (images according to the print job).

When all the print jobs are finished with the difference time within the predetermined time period (S12: Yes), then the CPU 74 determines whether or not there are any print jobs with the difference time out of the predetermined time period, in the print jobs included in the batch print list (S13). In other words, the CPU 74 determines whether or not there are any print jobs accepted earlier than the time before the start of the predetermined time period from the authentication time, in the print jobs included in the batch print list.

When there are no print jobs with the difference time out of the predetermined time period (S13: No), then the CPU 74 ends the print job process.

When there are print jobs with the difference time out of the predetermined time period (S13: Yes), then the CPU 74 controls the display 30 to display a process selection screen on the display 30 (S14).

The process selection screen displays, for example, the acceptance time of each print job with the difference time out of the predetermined time period in vertical rows, and displays a "Cancel" key and an "Execute" key in a horizontal row on the right side of each acceptance time. By operating the upward button or downward button of the crisscross button of the operating portion 40, it is possible to select one print job. A print job being selected is displayed with its acceptance time shown by colorless characters on a color background, whereas a print job being not selected is displayed with its acceptance time shown by color characters on the colorless background. Further, by operating the leftward button or rightward button of the crisscross button of the operating portion 40, it is possible to select one of the "Cancel" key and the "Execute" key. When one of the "Cancel" key and the "Execute" key is selected, then the other is not selected. The selected "Cancel" key or "Execute" key is displayed with color characters on the colorless background, whereas the unselected "Cancel" key or "Execute" key is displayed with the colorless characters on the color background.

Further, the above screen configuration and the selection operation described below are merely one example, and can be changed as appropriate.

After displaying the process selection screen, the CPU 74 determines whether or not there is an instruction to cancel any one of the print jobs with the difference time out of the predetermined time period (S15).

On the process selection screen, when the user selects a print job and then selects the "Cancel" key and, in this state, when the user further presses the OK button of the operating portion 40, then the CPU 74 determines that that cancelling that print job is instructed (S15: Yes), and thus cancels that print job from the RAM 73 (S16).

Further, when there is no instruction to cancel any print job (S15: No), the CPU 74 determines whether or not there is any instruction to carry out any one of the print jobs with the difference time out of the predetermined time period (S17).

On the process selection screen, when the user selects a print job and then selects the "Execute" key and, in this state, when the user further presses the OK button of the operating portion 40, then the CPU 74 determines that that executing that print job is instructed (S17: Yes), and thus executes that print job (S18).

Thereafter, the CPU 74 determines whether or not the selection is finished for cancelling or executing all the print jobs with the difference time out of the predetermined time period (S19).

The process of the steps S15 to S19 is repeated until the selection is finished for cancelling or executing all the print jobs with the difference time out of the predetermined time period.

When the selection is finished for cancelling or executing all the print jobs with the difference time out of the predetermined time period (S19: Yes), then the CPU 74 ends the print job process.

<Print Job Storage Process>

Figure 4:
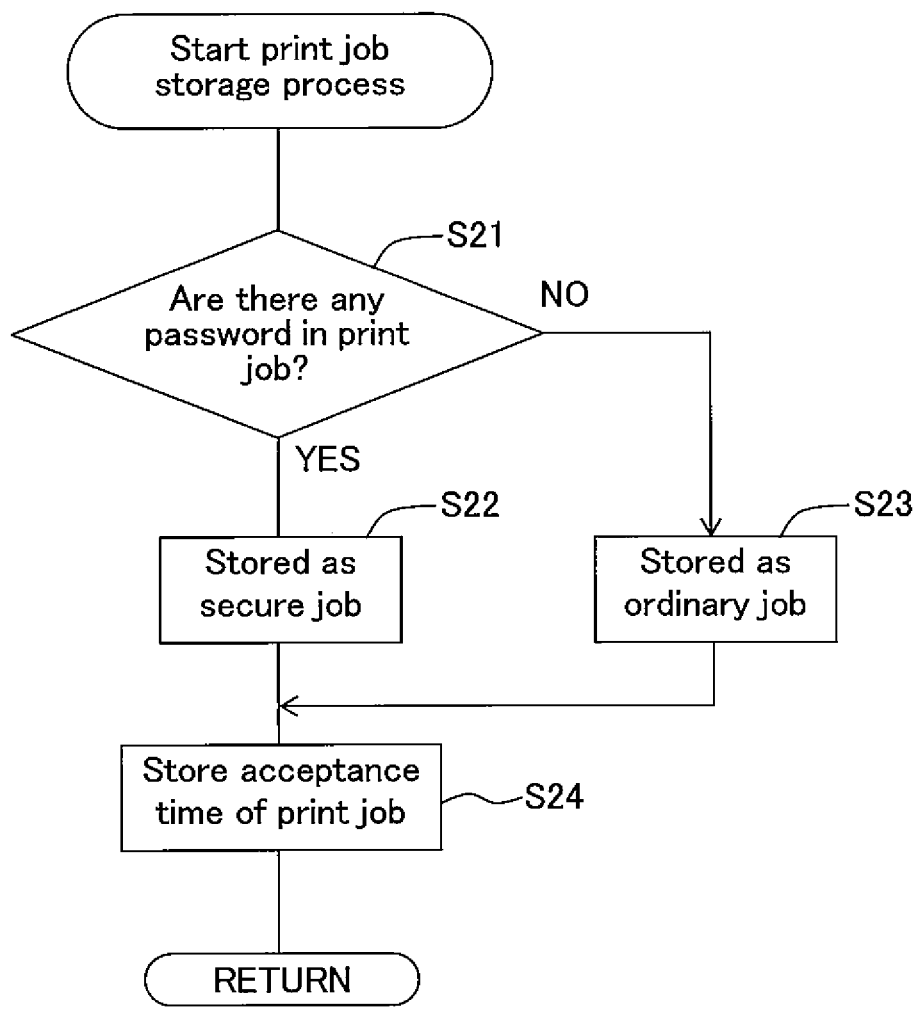
FIG. 4 is a flowchart showing a storage process flow of the print job.

FIG. 4 depicts a flow of the print job storage process carried out in the step S2 of FIG. 3A.

In the print job storage process, the CPU 74 determines whether or not a password for secure print is set in the print job accepted by the MFP 1 (S21).

When the password for secure print is set in the print job (S21: Yes), then the CPU 74 causes the RAM 73 to store that print job as a secure job (S22).

When the password for secure print is not set in the print job (S21: No), then the CPU 74 causes the RAM 73 to store that print job as an ordinary job (S23).

Then, the CPU 74 coordinates the print job stored in the RAM 73 with the acceptance time of accepting that print job, causes the RAM 73 to store the acceptance time (S24), and then returns the print job storage process to the start.

<Time Change Process>

Figure 5:
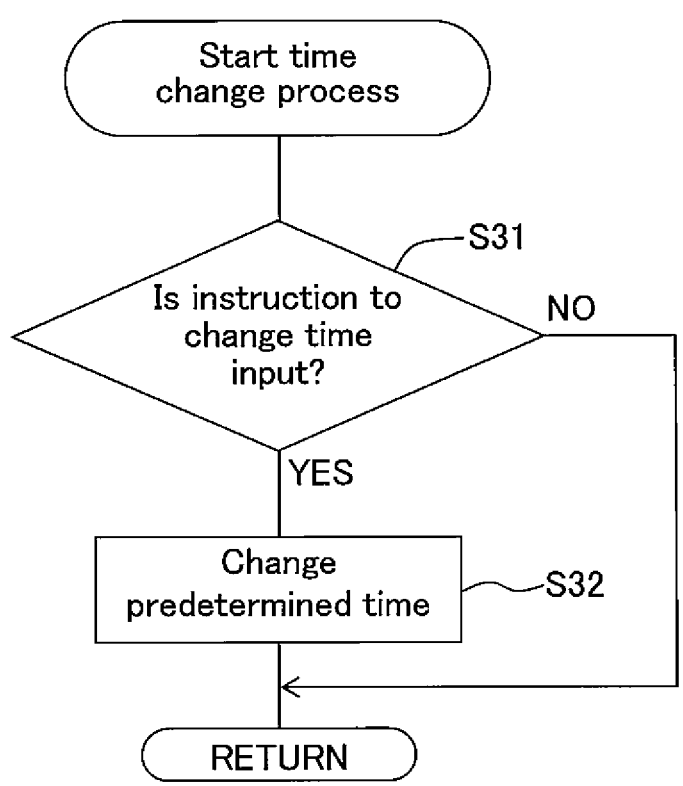
FIG. 5 is a flowchart showing a process flow of time change.

FIG. 5 depicts a flow of the time change process carried out in the step S3 of FIG. 3A.

In the time change process, the CPU 74 determines whether or not there is an instruction input from the operating portion 40 to change the predetermined time period (S31). For example, at the time of starting the print job process, the display displays a "Time Change" key. By operating the upward button or downward button of the crisscross button of the operating portion 40, it is possible for the user to switch between the "Time Change" key being selected and the "Time Change" key being not selected. The "Time Change" key being selected is displayed with the colorless characters of "Time Change" on a color background, whereas the "Time Change" key being not selected is displayed with the color characters of "Time Change" on the colorless background. With the "Time Change" key being selected, when the OK button of the operating portion 40 is pressed, then the CPU 74 determines that the instruction to change the predetermined time period is input, based on a signal from the operating portion 40.

When the instruction to change the predetermined time period is input (S31: Yes), then the CPU 74 controls the display 30 to display a predetermined time period input screen on the display 30 for inputting a predetermined time period. With the predetermined time period input screen being displayed, the user can manipulate the numerical keypad of the operating portion 40 to input his or her desired time (span). When the user inputs the time via the operating portion 40, then the CPU 74 changes the predetermined time period, which is the time range for selecting the print jobs to be carried out in the step S11 of FIG. 3B, to the input time (S32), and then returns the time change process to the start.

When the identification information is input to the ASIC 71 without input of the instruction to change the predetermined time period, then the CPU 74 returns the time change process to the start without changing the predetermined time period.

<Process of Selecting Secure Jobs>

Figure 6:
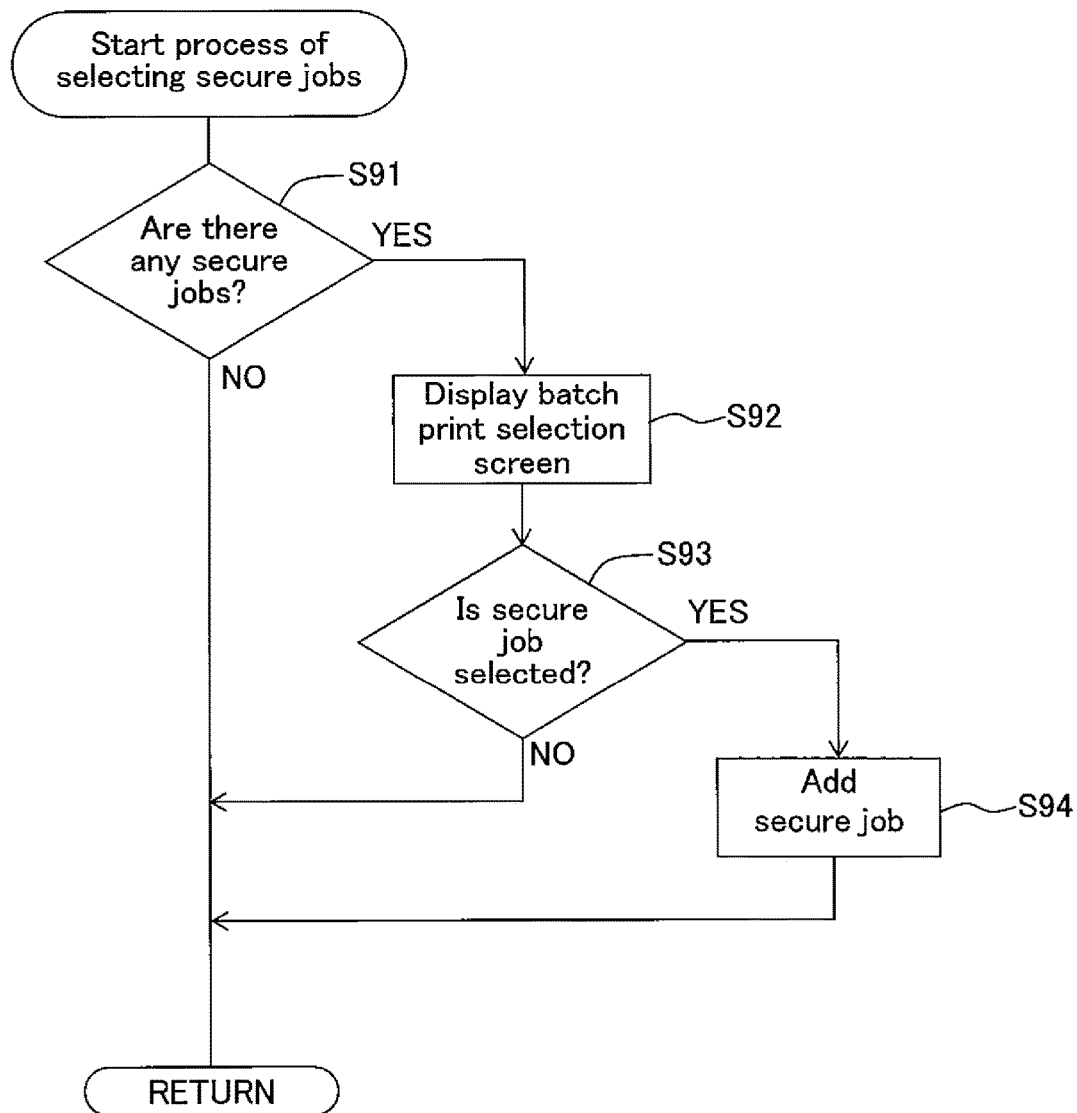
FIG. 6 is a flowchart showing a process flow of secure job selection.

FIG. 6 depicts a process flow of selecting secure jobs carried out in the step S9 of FIG. 3A.

In the process of selecting secure jobs, the CPU 74 determines whether or not any secure jobs are included in the print jobs accumulated in the RAM 73 (S91).

When no secure jobs are included (S91: No), then the CPU 74 returns the process of selecting secure jobs to the start.

When secure jobs are included (S91: Yes), then the CPU 74 controls the display 30 to display a batch print selection screen on the display 30 (S92).

The batch print selection screen displays, for example, the acceptance times of all the secure jobs accumulated in the RAM 73 in vertical rows. Further, at the right lower end of the batch print selection screen, a "Select" key and a "Cancel" key are displayed in a horizontal row.

Further, the above screen configuration and the selecting operation described below are merely one example, and can be changed as appropriate.

With the "Select" key being selected, when the OK button of the operating portion 40 is pressed, then the CPU 74 determines that the user has selected including the secure jobs into the batch print list (S93: Yes), and thus adds all the secure jobs accumulated in the RAM 73 to the batch print list. Thereafter, the CPU 74 returns the process of selecting secure jobs to the start.

With the "Cancel" key being selected, when the user presses the OK button of the operating portion 40, then the CPU 74 determines that the user has selected not including the secure jobs into the batch print list (S93: No), and thus returns the process of selecting secure jobs to the start without adding any secure jobs to the batch print list.

<An Example of Procedure of Carrying Out Print Jobs>

Using a specific example depicted in FIGS. 7 and 8, an explanation will be made on a procedure of carrying out print jobs when a user with user ID "X" has made the user authentication. Further, the predetermined time period, which is the time range for selecting the print jobs to be carried out in the step S11 of FIG. 3B, is set to 24 hours. As depicted in FIG. 7, the RAM 73 has accumulated some print jobs in the form of a table which coordinates the user ID, job name, password for secure print, and acceptance time.

In the example depicted in FIG. 7, five print jobs are accumulated in the RAM 73.

The earliest print job (accumulated at the earliest time) coordinates the user ID "X", job name "A", password "○○○○" for secure print, and acceptance time "2014.2.10. 22:00". This print job is a secure job in which a password for secure print is set. Hereinbelow, the print job with the job name "A" will be referred to as "print job A".

The second earliest print job coordinates the user ID "X", job name "B", and acceptance time "2014.2.15. 5:00". This print job does not coordinate any password for secure print. That is, the second earliest job is an ordinary job in which no password for secure print is set. Hereinbelow, the print job with the job name "B" will be referred to as "print job B".

The third earliest print job coordinates the user ID "Y", job name "C", password "ΔΔΔΔ" for secure print, and acceptance time "2014.2.12. 14:00". This print job is a secure job in which a password for secure print is set. Hereinbelow, the print job with the job name "C" will be referred to as "print job C".

The fourth earliest print job coordinates the user ID "X", job name "D", password "□□□□" for secure print, and acceptance time "2014.2.12. 18:00". This print job is a secure job in which a password for secure print is set. Hereinbelow, the print job with the job name "D" will be referred to as "print job D".

The latest print job coordinates the user ID "X", job name "E", password "xxxx" for secure print, and acceptance time "2014.2.12. 22:00". This print job is a secure job in which a password for secure print is set. Hereinbelow, the print job with the job name "E" will be referred to as "print job E".

Figure 8:
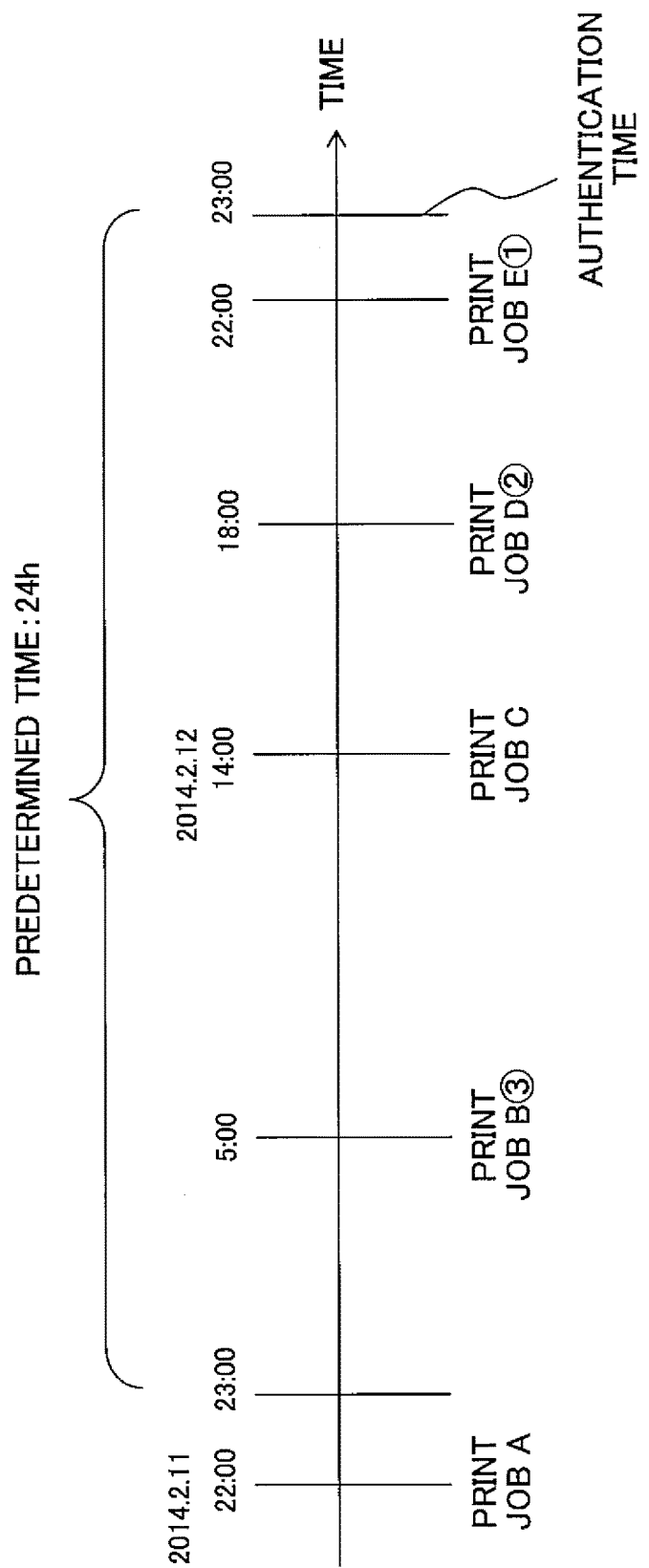
FIG. 8 is a time chart for explaining a procedure of carrying out the print jobs depicted in FIG. 7.

FIG. 8 depicts a time chart lining up those five print jobs in chronological order based on the acceptance time.

When the user with the user ID "X" has made the user authentication, then in the step S8 of FIG. 3A, the CPU 74 extracts the print job B which is an ordinary job of the user, and includes the print job B into the batch print list. Thereafter, when the user with the user ID "X" has selected adding secure jobs, then through the process of selecting secure jobs carried out in the step S9 of FIG. 3A, the CPU 74 adds, to the batch print list, the print job A, print job D and print job E which are secure jobs of the user.

The difference time (the time lag between the acceptance time and the authentication time) is 25 hours to the print job A included in the batch print list. The difference time is 18 hours to the print job B. The difference time is five hours to the print job D. The difference time is one hour to the print job E.

When the predetermined time period is set to 24 hours, which is the time range for selecting print jobs to be carried out in the step S11 of FIG. 3B, then the print jobs with the different time within 24 hours are the print job B, print job D, and print job D. Therefore, the step S11 of FIG. 3B carries out the print job B, print job D and print job E in preference to the print job A. The print job B, print job D and print job E are carried out in order from the latest acceptance time, that is, in the order of the print job E, print job D and print job B.

When the user with the user ID "X" has not selected adding secure jobs, then since the print job B is the only print job included in the batch print list, the print job B is carried out in preference to the print job A.

Further, for the print job A with the difference time out of the predetermined time period, the display 30 displays the process selection screen for the user to select deleting or carrying out the same (S14). Then, when deleting the print job A is selected, then the print job A is deleted from the RAM 73. When carrying out the print job A is selected, then the print job A is carried out following the print job B after carrying out the print job E, print job D and print job B in this order.

In the above manner, when the MFP 1 accepts a print job and the user ID of the user sending the print job, then the RAM 73 stores the acceptance time of the print job together with the print job and the user ID. When the user ID, input from a user ID input portion, is authenticated, then the print jobs associated with the user ID are extracted from the print jobs stored in the RAM 73. Then, for all the print jobs with the difference falling within the predetermined time period between the acceptance time of the extracted print jobs and the authentication time of authenticating the authentication information, the image forming portion 10 forms images on the paper. Therefore, it is possible for the user to obtain the printed materials (sheets of paper with the formed images) soon after authenticating the user ID, according to all the print jobs stored in the RAM 73 within that predetermined time period.

Further, for all the print jobs stored in the RAM 73 within the predetermined time period, the print jobs are carried out in order from the latest acceptance time for the image forming portion 10 to form images. It is predictable that the user desires to obtain the printed materials from those according to the print jobs with a later acceptance time. Therefore, it is possible to improve the user friendliness by carrying out the image formation in order according to the print jobs with a later acceptance time.

Among the print jobs stored in the RAM 73, when there are print jobs with the difference time out of the predetermined time period, then the display 30 displays the process selection screen. On the process selection screen, it is possible for the user to operate the operating portion 40 to instruct the printer to delete or carry out any print job as processing each print job with the difference time out of the predetermined time period. Hence, it is possible for the user to appropriately process the print jobs out of the predetermined time period.

When ordinary jobs and secure jobs are included in the print jobs stored in the RAM 73, then it is possible for the user to select whether or not to carry out the secure jobs with the difference time within the predetermined time period, together with all the ordinary jobs with the difference time within the predetermined time period. By virtue of this, it is possible for the user to collectively obtain the printed materials according to all the ordinary jobs stored within the predetermined time period span from the authentication time.

It is conventionally necessary to input a password for secure print at the time of carrying out each secure job. However, with the configuration of the present teaching, it is possible for the user to obtain the printed materials through the image formation according to any secure job without inputting any password for secure print for each secure job by selecting carrying out secure jobs together with ordinary jobs.

It is possible for the user to change the predetermined time period through the time change process. By virtue of this, it is possible to set the predetermined time period in consistency with the user's specification.

<Second Embodiment>

By setting the predetermined time period according to the first embodiment as a first time, and a time shorter than the first time as a second time, such a configuration may also be adopted as to carry out the print jobs with print jobs with the difference time within the second time in preference to the print jobs with the difference time within the first time but out of the second time.

Figure 9:
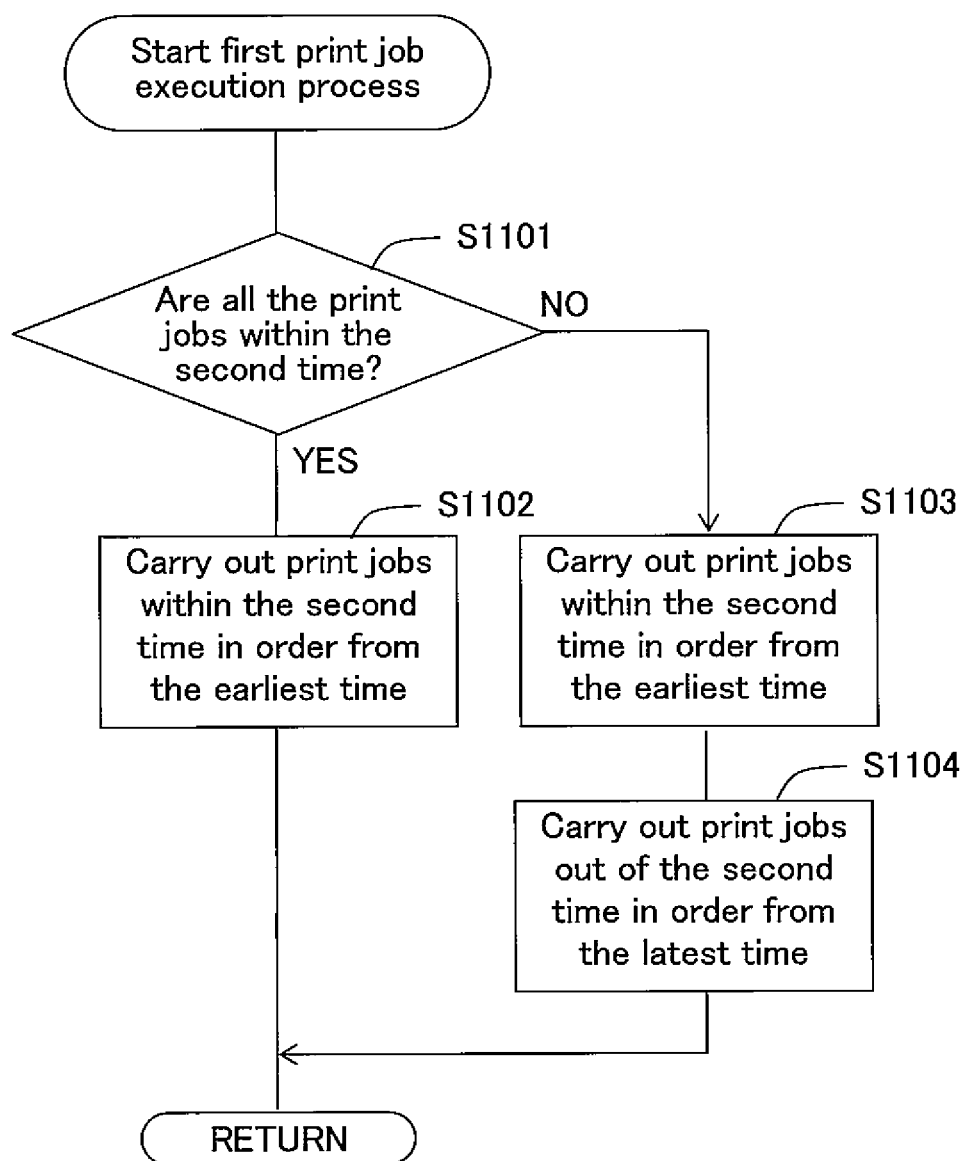
FIG. 9 is a flowchart showing a process flow of a first print job execution according to a second embodiment of the present invention.

When such configuration is adopted, then for example, the step S11 of FIG. 3B carries out a first print job execution process depicted in FIG. 9.

In the first print job execution process, the CPU 74 selects the print jobs with the difference time within the first time from the print jobs included in the batch print list. Then, it determines whether or not all the selected print jobs (to be simply referred to below as "all the print jobs) are with the difference time within the second time (S1101).

When all the print jobs are with the difference time within the second time (S1101: Yes), then the CPU 74 carries out all the print jobs with the difference time within the second time in order from the earliest acceptance time (S1102), and then returns the first print job execution process to the start.

When all the print jobs include not only those with the difference time within the second time but also those with the difference time out of the second time (S1101: No), then the CPU 74 carries out the print jobs with the difference time within the second time in order from the earliest acceptance time (S1103).

Thereafter, the CPU 74 carries out the print jobs with the difference time out of the second time in order from the latest acceptance time (S1104), and then returns the first print job execution process to the start.

With the five print jobs A to E depicted in FIG. 7 being accumulated in the RAM 73, when the user with the user ID "X" has made the user authentication, then in the step S8 of FIG. 3A, the CPU 74 extracts the print job B which is an ordinary job of the user, and includes the print job B into the batch print list. Thereafter, when the user with the user ID "X" has selected adding secure jobs, then through the process of selecting secure jobs carried out in the step S9 of FIG. 3A, the CPU 74 adds, to the batch print list, the print job A, print job D and print job E which are secure jobs of the user.

When the first time is set to 24 hours, and the second time is set to one hour, then the print jobs with the difference time within 24 hours (the first time) are the print job B, print job D and print job E, while the print job with the difference time within one hour (the second time) is the print job E. Therefore, the step S1101 of FIG. 9 determines that all the print jobs include not only those with the difference time within the second time but also the print job B with the difference time out of the second time. Then, the step S1103 carries out the print job E with the difference time within one hour in preference to the print job B and the print job D with the difference time over one hour. Thereafter, following carrying out the print job E, the CPU 74 carries out the print job B and print job D with the difference time over one hour in order from the latest acceptance time, that is, in the order of the print job D and print job B.

When the user with the user ID "X" has not selected adding secure jobs, then since the print job B is the only print job included in the batch print list, the print job B is carried out in preference to the print job A.

The process of the print job A is the same as in the first embodiment described earlier.

In the second embodiment, the image forming portion 10 carries out the image formation for the print jobs with the difference time within the second time shorter than the first time, in preference to the print jobs with the difference time within the first time but out of the second time.

It is conceivable that the print jobs with the difference time within the second time have a higher necessity than the print jobs with the difference time within the first time but out of the second time. Conversely, it is conceivable that the printed materials based on the print jobs with the difference time within the first time but out of the second time do not need to be obtained as soon as the printed materials based on the print jobs with the difference time within the second time. Therefore, it is possible to promptly obtain the printed materials through the image formation based on the print jobs with higher necessity, in preference to the printed materials without the necessity to be obtained soon.

Further, because it is conceivable that the print jobs within the second time have a high necessity, it provides a higher user friendliness to acquire the printed materials in the order of storage.

<Third Embodiment>

Figure 10:
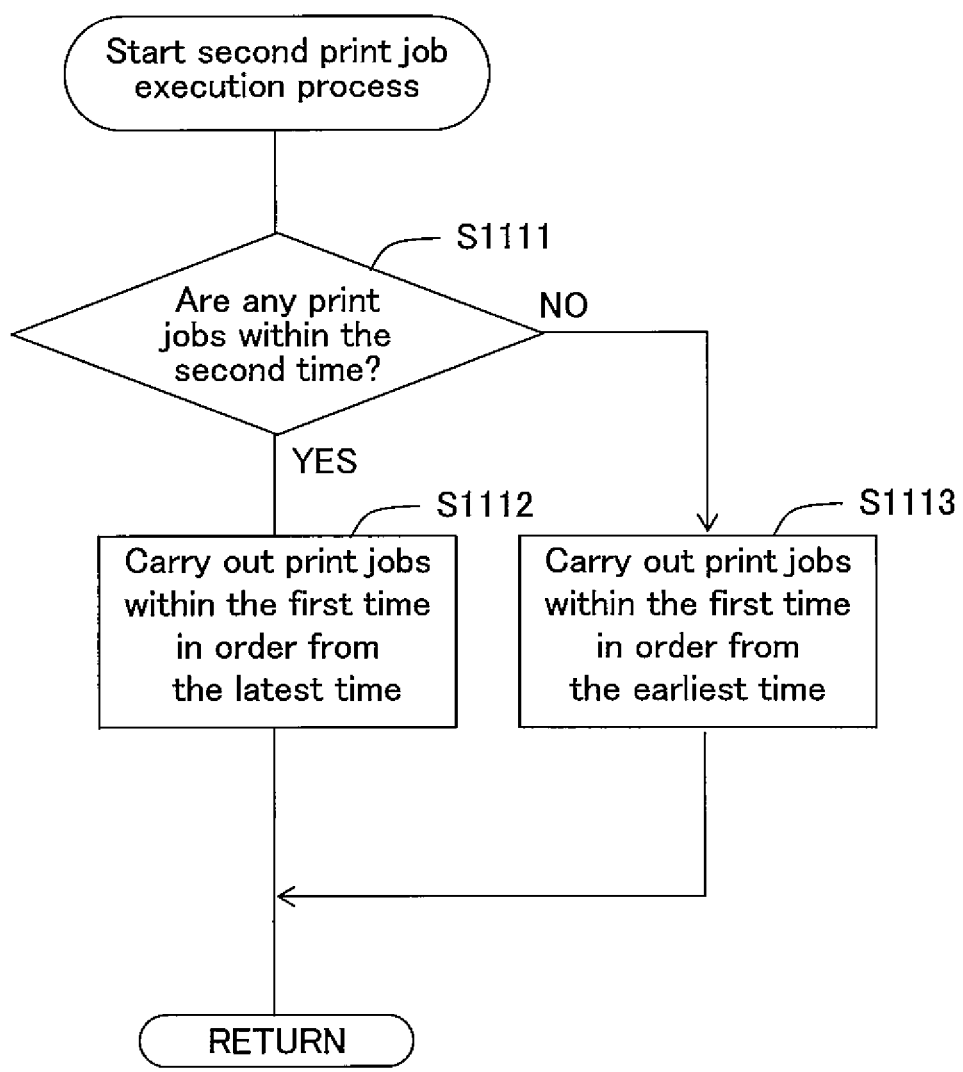
FIG. 10 is a flowchart showing a process flow of a second print job execution according to a third embodiment of the present invention.

In the step S11 of FIG. 3B, a second print job execution process depicted in FIG. 10 may be carried out instead of the first print job execution process depicted in FIG. 9.

In the second print job execution process, the CPU 74 selects the print jobs with the difference time within the first time from the print jobs included in the batch print list. Then, it determines whether or not there are any print jobs with the difference time within the second time among all the print jobs selected above (S1111).

When there are print jobs with the difference time within the second time among all the print jobs (S1111: Yes), then the CPU 74 carries out all the print jobs with the difference time within the first time in order from the latest acceptance time (S1112), and then returns the second print job execution process to the start.

When there are no print jobs with the difference time within the second time among all the print jobs (S1111: No), then the CPU 74 carries out the print jobs with the difference time within the first time in order from the earliest acceptance time (S1113), and then returns the second print job execution process to the start.

In the third embodiment, when the RAM 73 has stored even only one print job with the difference time within the second time shorter than the first time, then all the print jobs with the difference time within the first time are carried out in order from the latest acceptance time. By virtue of this, it is possible to promptly obtain the printed materials through the image formation based on all the print jobs with the difference time within the first time, in order from the printed materials through the image formation based on the print jobs with higher necessity. Further, when the RAM 73 has not stored even only one print job with the difference time within the second time, then there is no latest print job. Hence, all the print jobs with the difference time within the first time are carried out in order from the earliest acceptance time.

<Modifications>

While the embodiments of the present teaching are explained above, it is possible to embody the present teaching in other forms.

For example, in the above embodiments, it is supposed that when the user lets his or her ID card approach the NFC portion 50, then the NFC portion 50 reads in the identification information (the user ID and password for user authentication) from the ID card, and that identification information is input to the ASIC 71. However, without being limited to this process, the user may otherwise operate the operating portion 40 to input the user ID and the password for user authentication.

Further, the above embodiments are explained with the case that the CPU 74 carries out each process. However, one or more CPUs may be added to the control portion 70 such that the CPU 74 of the ASIC 71 and the added CPUs may cooperate to carry out each process. Further, the ASIC 71 may have some processing circuits such that by a trigger from the CPU 74, the processing circuits may carry out each process. Furthermore, the CPU 74 may causes some processing circuits provided outside of the ASIC 71 to carry out each process.

Further, in the above embodiments, the MFP 1 is taken as an example of the image forming apparatus, having an image formation function (print function) based on the image forming portion 10. However, the image forming apparatus may be a single function apparatus having an image formation function.

In addition, it is possible to apply various design changes to the configurations described above within the scope of the matters set forth in the appended claims.

What is claimed is:

1. An image forming apparatus configured to form an image, comprising:
    a controller;
    a display;
    an image forming portion configured to form an image on a sheet;
    a communication interface configured to receive a plurality of print jobs from an external device, wherein each of the plurality of print jobs includes associated first identification information;
    a memory configured to store the plurality of print jobs and the associated first identification information; and
    a near-field communication interface configured to obtain second identification information from a non-contact information card,
    wherein the controller is configured to:
        associate an acceptance time with each of the plurality of print jobs and store the associated acceptance time in the memory,
        authenticate the second identification information as matching at least one of an identification stored in an identification table stored in the memory,
        when the second identification is authenticated: establish an authentication time; extract one or more of the plurality of print jobs from the memory, the extracted print jobs having the first identification matching the second identification; and associate the authentication time with each of the extracted print jobs,
        determine a difference time for each of the extracted print jobs, the difference time being a difference in time between the authentication time and the acceptance time associated with each of the extracted print jobs,
        cause the image forming portion to carry out image formation on the extracted print jobs having a first difference time without requiring user input, the first difference time comprising the determined difference time that is within a first time period, and
        cause the image forming portion to carry out image formation on the extracted print jobs having a second difference time, the second difference time comprising the determined difference time that is outside the first time period, by displaying the extracted print jobs having the second difference time on the display, without displaying the extracted print jobs having the first difference time, and by receiving a user instruction to carry out image formation through selection of one or more of the displayed extracted print jobs.

2. The image forming apparatus according to claim 1, wherein the controller is configured to cause the image forming portion to carry out the image formation in order from the extracted print jobs with the latest acceptance time.

3. The image forming apparatus according to claim 1, wherein the plurality of print jobs comprise: one or more secure jobs coordinated with an unlocking data permitting the image forming portion to carry out the image formation; and one or more ordinary print jobs without the unlocking data.

4. The image forming apparatus according to claim 3, wherein the controller is configured to cause the image forming portion to carry out selecting whether or not to carry out the image formation for the secure jobs of which the determined difference times are within the first time period, together with the ordinary jobs.

5. The image forming apparatus according to claim 1, wherein the controller is configured to carry out changing the first time period.

* * * * *